United States Patent [19]

Maeda

[11] Patent Number: 4,462,633
[45] Date of Patent: Jul. 31, 1984

[54] DOOR STOP ARRANGEMENT FOR A VEHICLE

[75] Inventor: Kouzo Maeda, Yokosuka, Japan

[73] Assignee: Nissan Motor Co., Limited, Yokohama, Japan

[21] Appl. No.: 392,522

[22] Filed: Jun. 28, 1982

[30] Foreign Application Priority Data

Jul. 3, 1981 [JP] Japan ............... 56-99938[U]

[51] Int. Cl.³ ............................................ B62D 25/04
[52] U.S. Cl. ........................................ 296/188; 296/146
[58] Field of Search ............... 296/30, 185, 187–189, 296/146, 29, 202, 203, 208, 209

[56] References Cited

U.S. PATENT DOCUMENTS

| 708,723 | 9/1902 | Mathis | 296/29 |
| 1,411,260 | 4/1922 | Baker et al. | 296/29 |
| 2,380,523 | 7/1945 | Hicks et al. | 296/30 |
| 2,627,437 | 2/1953 | Toncray et al. | 296/203 |
| 3,788,686 | 1/1974 | Rossie et al. | 296/146 |
| 3,887,227 | 6/1975 | Deckert | 296/188 |
| 4,307,911 | 12/1981 | Pavlik | 296/188 |

FOREIGN PATENT DOCUMENTS 2383059 11/1978 France ............... 296/188

Primary Examiner—Robert B. Reeves
Assistant Examiner—Dennis H. Pedder
Attorney, Agent, or Firm—Leydig, Voit, Osann, Mayer and Holt, Ltd.

[57] ABSTRACT

A robustly constructed box-shaped reinforcing member is securely mounted to a vehicle floor panel with its one end portion located at a side sill above which a door opening is defined. A bracket member is securely mounted to the hinged side door at a portion which is engageable with the end of the reinforcing member when the door assumes its closed position. Thus, when the side door tends to be forced into the passenger compartment by an external force applied thereto, the bracket member movable with the door is brought into engagement with the end of the reinforcing member thereby preventing the side door from continuing its inward movement.

4 Claims, 7 Drawing Figures

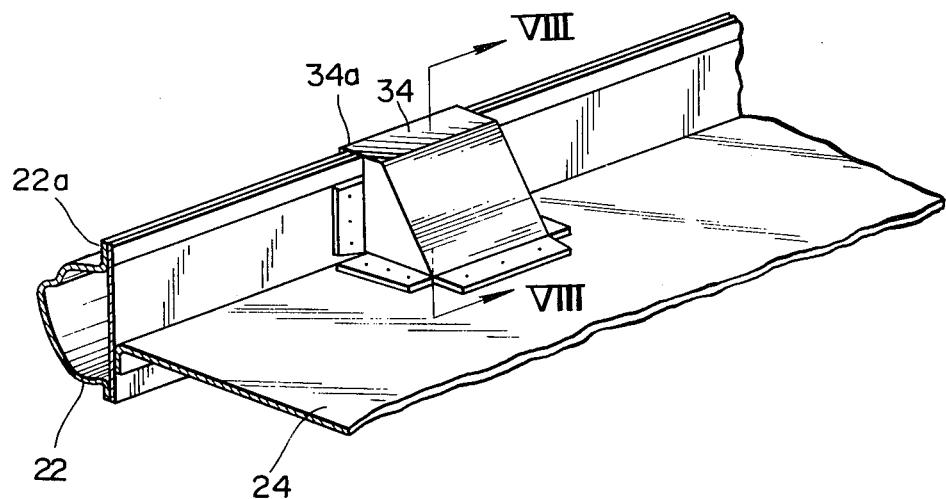
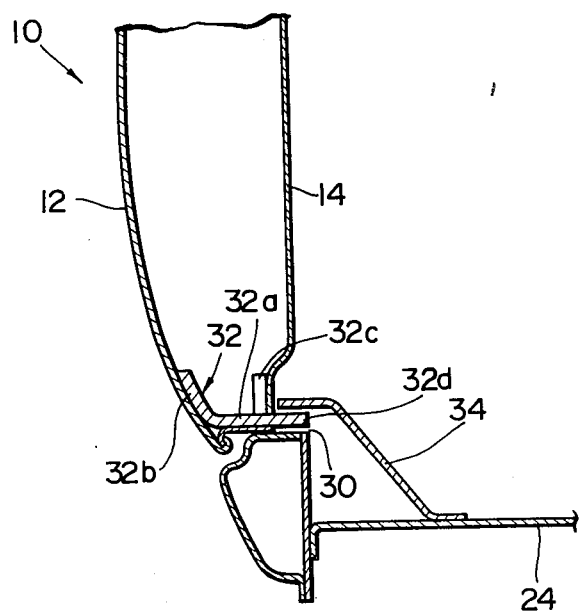

DOOR STOP ARRANGEMENT FOR A VEHICLE

BACKGROUND OF THE INVENTION

1. Field of the Invention

The present invention relates in general to a vehicle body construction having a safety means for protecting passengers from injury in the event of a vehicle collision, and more particularly to a door stop arrangement for a vehicle, which prevents a hinged side door from being forced into the passenger compartment during a side impact.

2. Description of the Prior Art

When a motor vehicle is subjected to a side impact during a vehicle collision causing deformation of a side door thereof, the door thus deformed tends to be driven into the passenger compartment, so that sometimes a passenger in the compartment is trapped between the driven door and any projecting device, such as a console box, mounted in the compartment, thus endangering the passenger's life. Hitherto, various solutions have been proposed for eliminating such a problem. However, some of them lack a functional reliability and an economical support.

SUMMARY OF THE INVENTION

According to the present invention, there is provided a door stop arrangement in a vehicle having a hinged side door which is operable to open and close a door opening defined above a side sill mounted to a lateral side of a vehicle floor panel. The arrangement comprises a reinforcing member robustly mounted onto the floor panel with its one end located at the side sill; a bracket member securely mounted to the hinged side door at a portion which is engageable with the end of the reinforcing member when the door assumes its closed position; and means for assuring the engagement of the bracket member with the end of the reinforcing member upon closing of the hinged side door. Thus, when the side door tends to be forced into the passenger compartment by an external force applied thereto, the bracket member movable with the door is brought into engagement with the end of the reinforcing member thereby preventing the door from continuing its inward movement.

BRIEF DESCRIPTION OF THE DRAWINGS

Other objects and advantages of the present invention will become clear from the following description when taken in conjunction with the accompanying drawings, in which:

FIG. 7 is a fragmentary perspective view of an essential portion of a door stop arrangement of a second embodiment according to the present invention; and FIG. 8 is a sectional view taken along the line VIII—VIII of FIG. 7, with a hinged side door assuming its closed position.

DESCRIPTION OF THE INVENTION

Prior to describing the embodiments of the present invention, a conventional door stop arrangement will be described with reference to FIGS. 1 to 3 in order to clarify the invention.

Figure 1:
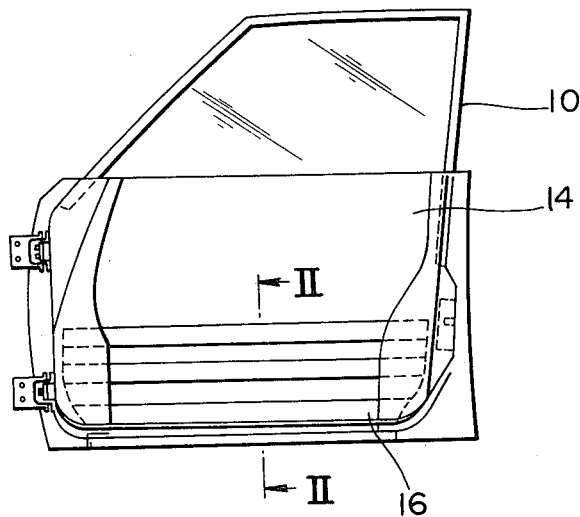
FIG. 1 is a front view of a hinged side door to which a conventional door stop arrangement is applied.
Figure 3:
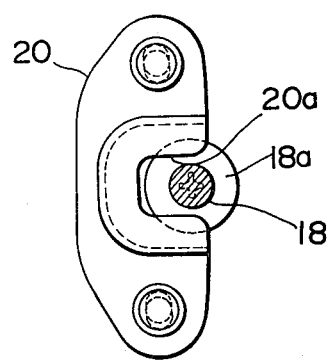
FIG. 3 is view taken from the direction of the line III—III of FIG. 2.
Figure 2:
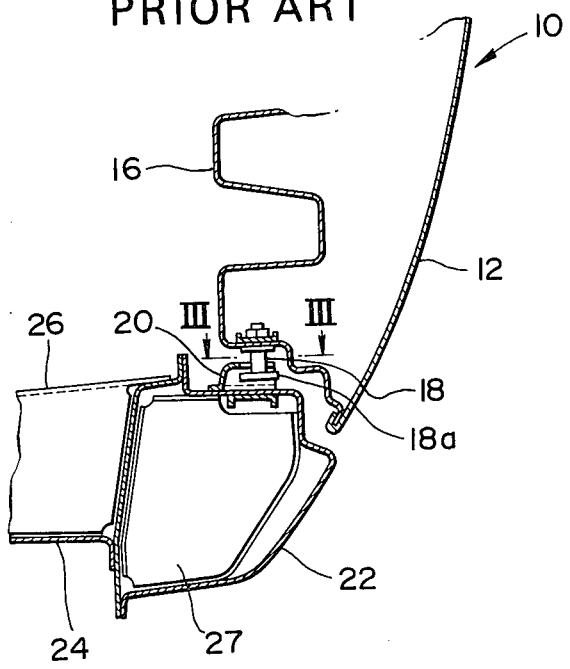
FIG. 2 is a sectional view taken along the line II—II of FIG. 1, with a side sill of the vehicle floor.

Referring to FIGS. 1 to 3, there is shown a conventional door stop arrangement which is disclosed in Laid-open Japanese Utility Model Application Specification No. 55-87812.

In the drawings, numeral 10 designates a higned side door which generally comprises an outer panel 12 and an inner panel 14. As is seen from FIG. 2, the lower portion of the inner panel 14 is replaced by a corrugated reinforcing plate 16. A bolt member 18 is secured to the lower portion of the reinforcing plate 16, with its enlarged head 18a projected downward. Upon normal closing of the door 10, the bolt member 18 thus movable with the door 10 is loosely caught by a catch member 20, as shown by FIG. 3, which is secured to a vehicle body side. More specifically, the catch member 20 is securely mounted on a side sill 22 secured to a vehicle floor panel 24, and has a recess 20a (see FIG. 3) into which the bolt member 18 is received upon the door closing. The floor panel 24 is reinforced by a rib member 26 which is fixed thereto adjacent the catch member 20.

Upon a side vehicle collision forcing the door 10 to be driven into the passenger compartment, the bolt member 18 is brought into engagement with the catch member 20 thereby preventing the door 10 from continuing its inward movement.

In fact, upon such a vehicle collision, the impact force applied to the door 10 is transmitted to the reinforcing member 26 through the bolt member 18, the catch member 20 and the side sill 22. Thus, in such a conventional arrangement, it is important to arrange and construct all of the bolt member 18, the catch member 20 and the side sill 22 to have tough construction for the assured door stopping. This arrangement and construction causes however complicated and heavy weight construction of the door stop arrangement. In fact, in practical use, several reinforcing plates 27 are mounted in the side sill 22 for increasing the mechanical strength of the side sill 22.

Therefore, it is an essential object of the present invention to provide a door stop arrangement which is free of the above-mentioned drawback.

Figure 4:
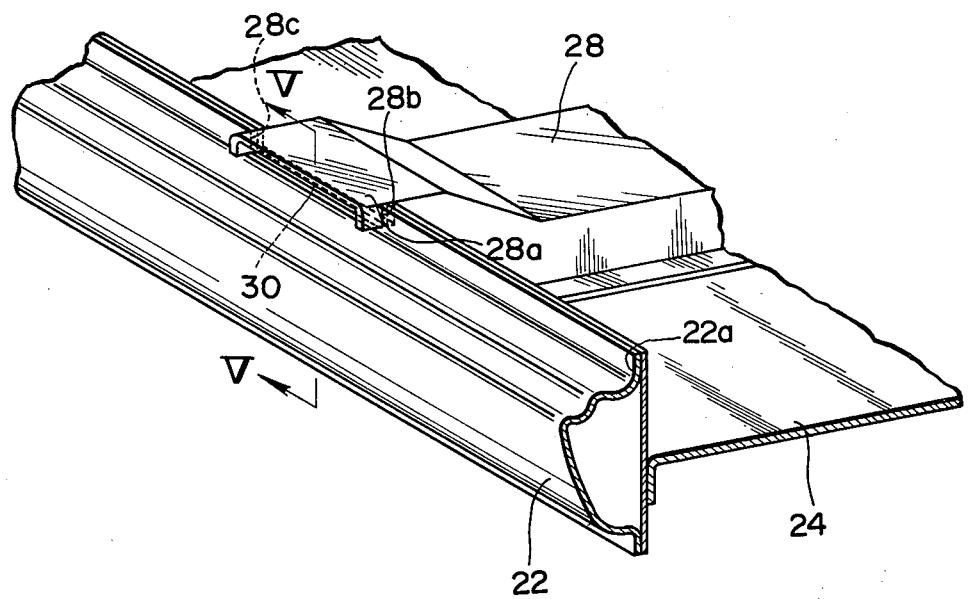
FIG. 4 is a fragmentary perspective view of an essential portion of a door stop arrangement of a first embodiment according to the present invention.
Figure 5:
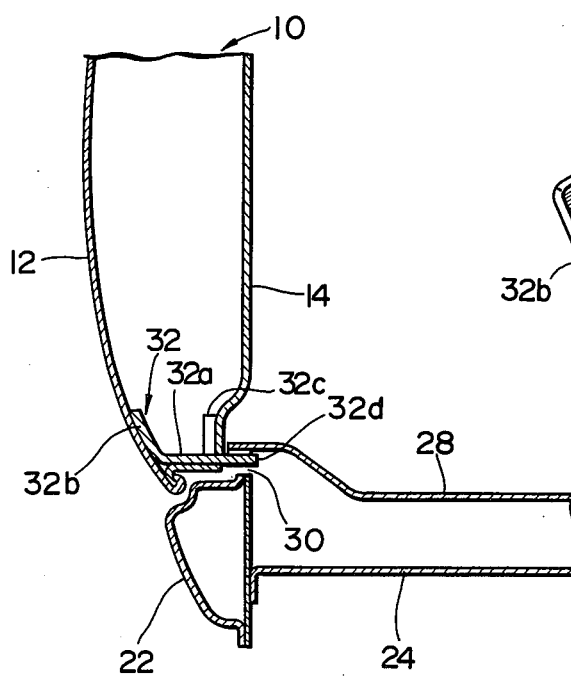
FIG. 5 is a sectional view taken along the line V—V of FIG. 4, with a hinged side door assuming its closed position.
Figure 6:
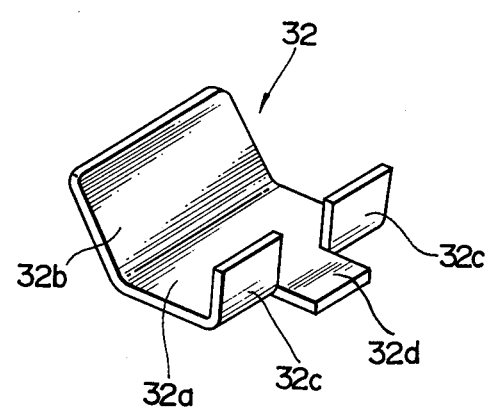
FIG. 6 is a perspective view of a rigid bracket member employed in the present invention.

Referring to FIGS. 4 to 6, there is shown a first embodiment of the present invention. The door stop arrangement of this embodiment comprises a rectangular box-shaped elongate cross member 28 which is securely mounted on a floor panel 24 to extend laterally between side sills 22 (only one is shown). As is seen from FIG. 4, each end of the cross member 28 is enlarged and has a flanged extension 28a which grips an upper flange portion 22a of the side sill 22. For achieving tight connection with the flange portion 22a of the side sill 22, the extension 28a is formed at downwardly extending flanges (no numerals) with aligned slits 28b and 28c into which the upper flange portion 22a is snugly received. For the reason which will become clear as the description proceeds, the flange portion 22a of each side sill 22 is formed, at the section between the downwardly extending flanges of the extension 28a, with an elongate slot 30.

As is understood from FIG. 5, a rigid bracket 32 is securely mounted to the lower portion of the door 10, which is engageable with the elongate slot 30 when the door 10 assumes its closed position. The bracket 32 comprises, as is shown by FIG. 6, a base portion 32a attached to a lower flat section of the door inner panel 14, an inclined outer flange portion 32b attached to the door outer panel 12, two spaced upright flange portions 32c attached to the upright portion of the door inner panel 14, and a laterally extending projection 32d. The projection 32d projects from the door inner panel 14 toward the vehicle floor and is sized and constructed to be received in the elongate slot 30 of the side sill flange portion 22a when the door 10 assumes its closed position.

When the vehicle is subjected to a side impact collision, that is, when another vehicle collides against the door 10 causing deformation of the same, the deformed door tends to be forced into the passenger compartment. However, the forcing in motion of the door is blocked safely by the cross member 28 which is robustly mounted to the floor panel 14. Thus, the passenger in the passenger compartment is protected from injury. It is to be noted that the impact force applied to the door 10 is directly transmitted to the cross member 28, unlike in the case of the above-mentioned conventional arrangement. Although, upon the vehicle collision, the door 10 is deformed with its lower portion raised, the degree of the deformation of the lower portion is small because of the locking engagement between the bracket projection 32d and the elongate slot 30 of the side sill flange portion 22a.

Referring to FIGS. 7 and 8, there is shown a second embodiment of the present invention. The door stop arrangement of this second embodiment is substantially the same in construction as that of the first embodiment except for the means which directly receives the impact force applied to the door 10.

In the second embodiment, two compact box-shaped members 34 (only one is shown) are employed as a substitute for the single rectangular box-shaped elongate cross member 28 of the first embodiment. As is seen from FIG. 8, the connection of each box-shaped member 34 to both the floor panel 24 and the side sill flange portion 22a is made in substantially the same manner as in case of the first embodiment. An elongate slot 30 is formed in the flange portion 22a at the portion corresponding to the portion where the slot 30 of the first embodiment is located.

Since the function of the door stop arrangement of this second embodiment is substantially the same as that of the first embodiment, the description of it will be omitted.

As is understood from the foregoing description, in accordance with the present invention, the impact force applied to the door 10 is directly received by the reinforcing cross member 28 or 34 which is robustly mounted to the vehicle floor panel 24. Thus, in the present invention, the safety protection of the passenger can be assured by considering only the mechanical strength of the reinforcing member mounted on the vehicle floor panel. This induces light weight and low cost production of the door stop arrangement.

What is claimed is:

1. A door stop arrangement in a vehicle having a hinged side door which is operable to open and close a door opening defined above a side sill mounted on a lateral side of a vehicle floor panel, said door stop arrangement comprising:

a reinforcing member robustly mounted onto said floor panel with its one end located at said side sill;
a bracket member securely mounted to and movable with said hinged side door at a portion which is engageable with the end of said reinforcing member when said door assumes its closed position, said bracket member comprising a base portion attached to a lower flat section of the door inner panel, an inclined outer flange portion attached to the door outer panel, two spaced upright flange portions attached to an upright portion of the door inner panel, and a laterally extending flat projection; and
means including a horizontal slot in said side sill for receiving said laterally extending flat projection for assuring the engagement of said bracket member with the end of said reinforcing member upon closing of said hinged side door,
whereby when said side door tends to be forced into the passenger compartment by an external force applied thereto, said bracket member is brought into engagement with the end of said reinforcing member thereby preventing said door from continuing its inward movement.

2. A door stop arrangement as claimed in claim 1, in which said reinforcing member is a box-shaped member which is securely mounted on said vehicle floor panel with its one end gripping an upper flange portion of said side sill.

3. A door stop arrangement as claimed in claim 2, in which said reinforcing member is a box-shaped elongate member which laterally extends between two side sills which are mounted on the lateral sides of the vehicle floor panel.

4. A door stop arrangement as claimed in claim 3, in which the end of said box-shaped member has two spaced downwardly extending flanges which are respectively formed with aligned slits into which the flange portion of said side sill is snugly received.

* * * * *